US012621906B2

(12) United States Patent
Chen

(10) Patent No.: US 12,621,906 B2
(45) Date of Patent: May 5, 2026

(54) PACKET DATA CONVERGENCE PROTOCOL STATUS REPORTING METHOD, PACKET DATA CONVERGENCE PROTOCOL STATUS RECEIVING METHOD, TERMINAL AND DEVICE

(71) Applicant: DATANG MOBILE COMMUNICATIONS EQUIPMENT CO., LTD., Beijing (CN)

(72) Inventor: Li Chen, Beijing (CN)

(73) Assignee: DATANG MOBILE COMMUNICATIONS EQUIPMENT CO., LTD., Beijing (CN)

( * ) Notice: Subject to any disclaimer, the term of this patent is extended or adjusted under 35 U.S.C. 154(b) by 387 days.

(21) Appl. No.: 18/033,051

(22) PCT Filed: Sep. 16, 2021

(86) PCT No.: PCT/CN2021/118769
    § 371 (c)(1),
    (2) Date: Apr. 20, 2023

(87) PCT Pub. No.: WO2022/083368
    PCT Pub. Date: Apr. 28, 2022

(65) Prior Publication Data
    US 2023/0389129 A1    Nov. 30, 2023

(30) Foreign Application Priority Data

Oct. 23, 2020    (CN) ......................... 202011144474.5

(51) Int. Cl.
    *H04W 4/06*       (2009.01)
    *H04W 36/08*      (2009.01)
    *H04W 76/40*      (2018.01)

(52) U.S. Cl.
    CPC ........... *H04W 76/40* (2018.02); *H04W 36/08* (2013.01)

(58) Field of Classification Search
    CPC .......... H04L 2001/0093; H04W 76/40; H04W 4/06; H04W 76/19; H04W 36/0007
    See application file for complete search history.

(56) References Cited

U.S. PATENT DOCUMENTS

| | | |
|---|---|---|
| 2017/0215225 A1 | 7/2017 | Yi et al. |
| 2018/0206167 A1 | 7/2018 | Jactat |

(Continued)

FOREIGN PATENT DOCUMENTS

| | | |
|---|---|---|
| CN | 106537882 A | 3/2017 |
| CN | 108029158 A | 5/2018 |

(Continued)

OTHER PUBLICATIONS

Office Action in the corresponding European Patent Application No. 21881787.2, issued on Nov. 28, 2024.
3rd Generation Partnership Project; Technical Specification Group Radio Access Network; Evolved Universal Terrestrial Radio Access (E-UTRA); Packet Data Convergence Protocol (PDCP) specification (Release 8), 3GPP TS 36.323 V8.0.0, Dec. 1, 2007.

(Continued)

*Primary Examiner* — Shukri Taha
(74) *Attorney, Agent, or Firm* — Ladas & Parry, LLP

(57) ABSTRACT

Disclosed are a packet data convergence protocol status reporting method, a packet data convergence protocol status receiving method, a terminal and devices. The method at the terminal side includes: in case of receiving the MBS, triggering to report a packet data convergence protocol (PDCP) status according to a preset condition; transmitting a PDCP status report on a predetermined uplink channel.

15 Claims, 6 Drawing Sheets

(56) References Cited

U.S. PATENT DOCUMENTS

| | | | | |
|---|---|---|---|---|
| 2019/0053098 | A1 | 2/2019 | Jo et al. | |
| 2020/0099481 | A1 | 3/2020 | Pan et al. | |
| 2020/0323024 | A1 | 10/2020 | Huang et al. | |
| 2021/0400528 | A1 | 12/2021 | Li et al. | |
| 2022/0141626 | A1 | 5/2022 | Xu et al. | |
| 2022/0322289 | A1* | 10/2022 | Xu | H04L 1/1887 |
| 2022/0361053 | A1* | 11/2022 | Ohlsson | H04W 36/023 |
| 2023/0110505 | A1* | 4/2023 | Wang | H04L 1/08 |
| | | | | 370/331 |
| 2023/0388866 | A1* | 11/2023 | Di Gorolamo | H04W 36/0007 |
| 2023/0403760 | A1* | 12/2023 | Pham Van | H04W 76/40 |
| 2024/0260124 | A1* | 8/2024 | Fujishiro | H04W 76/27 |

FOREIGN PATENT DOCUMENTS

| | | | | | |
|---|---|---|---|---|---|
| CN | 109039548 | A | 12/2018 | | |
| CN | 109982266 | A | 7/2019 | | |
| CN | 110431876 | A | 11/2019 | | |
| CN | 110798287 | A | 2/2020 | | |
| CN | 111757293 | A | 10/2020 | | |
| CN | 112235731 | A | 1/2021 | | |
| EP | 3723395 | A1 | 10/2020 | | |
| EP | 3913832 | A1 | 11/2021 | | |
| WO | 2015061983 | A1 | 5/2015 | | |
| WO | WO-2019129212 | A1 * | 7/2019 | | H04L 12/189 |
| WO | 2020191560 | A1 | 10/2020 | | |
| WO | WO-2022240984 | A2 * | 11/2022 | | H04W 68/02 |

OTHER PUBLICATIONS

Extended European Search Report for the corresponding European Patent Application No. 21881787.2 issued by the European Patent Office on Mar. 12, 2024.

"UE Reception Model of MBS Radio Bearer and Its Dynamic PTM/PTP switch," 3GPP TSG-RAN WG2 Meeting #111 electronic, R2-2006575, Online, Aug. 17-28, 2020, Agenda Item: 8.1.2.1, Source: MediaTek Inc.

International Search Report for PCT/CN2021/118769 issued on Dec. 2, 2021 and its English Translation provided by WIPO.

Written Opinion (corrected version) for PCT/CN2021/118769 issued on Dec. 2, 2021 and its English Translation provided by WIPO.

International Preliminary Report on Patentibily for PCT/CN2021/118769 issued on Apr. 13, 2023 and its English translation provided by WIPO.

"Reliability Enhancement for PTM Transmission," 3GPP TSG RAN WG2#112-e, R2-2008792, Electronic meeting, Nov. 2-13, 2020 , Source: CATT, Agenda Item: 8.1.2.1, all pages.

First Chinese Office Action and search report for Chinese Patent Application No. 202011144474.5 issued by the Chinese Patent Office on Aug. 26, 2022 and its English translation provided by Chinese Patent Office.

"PDCP Count Value Alignment to support of Loss-less handover for 5G Mbs," 3GPP TSG-RAN WG2 Meeting #111e R2-2007467, Online, Aug. 17-28, 2020, Agenda Item: 8.1.2.2, Source: Lenovo, Motorola Mobility, all pages.

* cited by examiner

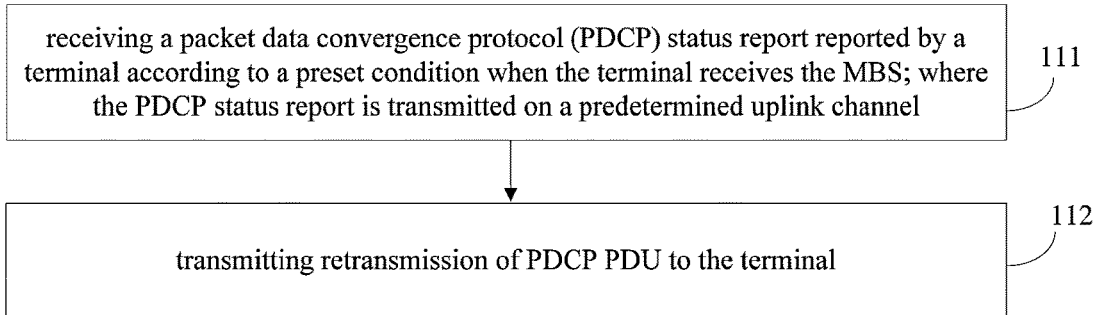

receiving a packet data convergence protocol (PDCP) status report reported by a terminal according to a preset condition when the terminal receives the MBS; where the PDCP status report is transmitted on a predetermined uplink channel — 111 transmitting retransmission of PDCP PDU to the terminal — 112

FIG. 11

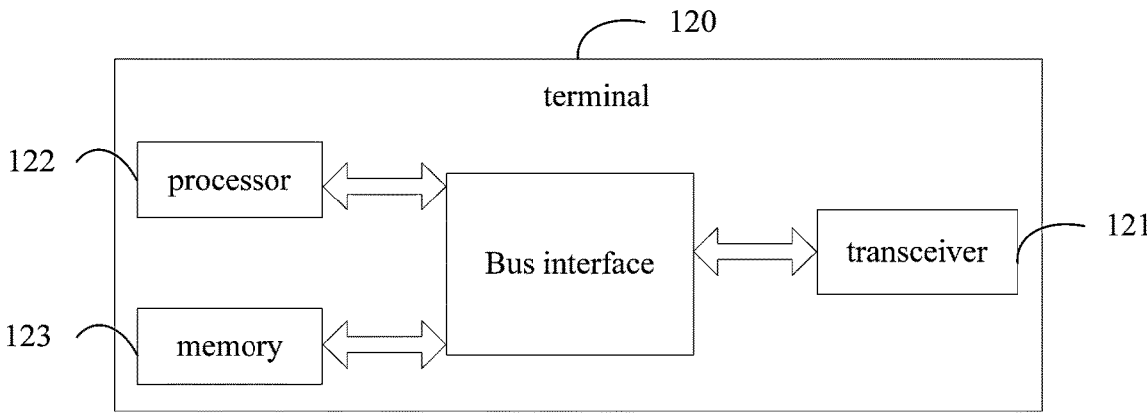

120 terminal

122 — processor

Bus interface transceiver — 121

123 — memory

FIG. 12

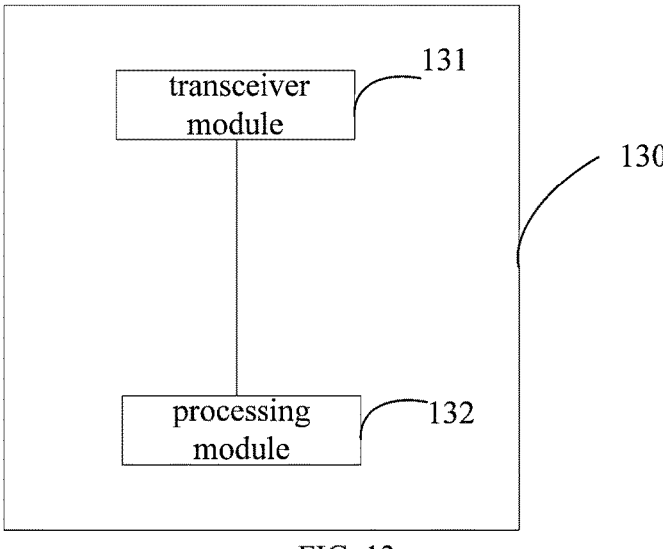

transceiver module — 131

130 processing module — 132

FIG. 13

PACKET DATA CONVERGENCE PROTOCOL STATUS REPORTING METHOD, PACKET DATA CONVERGENCE PROTOCOL STATUS RECEIVING METHOD, TERMINAL AND DEVICE

CROSS-REFERENCE TO RELATED APPLICATIONS

This application is the U.S. national phase of PCT Application PCT/CN2021/118769 filed on Sep. 16. 2021, which claims the priority of priority to the Chinese Application No. 202011144474.5, filed on Oct. 23, 2020, the disclosure of which is incorporated in its entirety by reference herein. the disclosures of which are incorporated in their entireties by reference herein.

TECHNICAL FIELD

The present disclosure relates to the field of communication technologies, and in particular to a packet data convergence protocol status reporting method, a packet data convergence protocol status receiving method, a terminal and devices.

BACKGROUND

Multimedia broadcast multicast service (MBMS) services have existed for a long time in the 3G and 4G technologies. Due to requirements of multicast and broadcast services, MBMS services are introduced in the 5G technology, and are referred as multicast and broadcast services (MBS) in 5G. 5G MBS services are transmitted independently in each cell. A service that needs to perform broadcast multicast transmission is mapped to broadcast and multicast channels and transmitted to multiple terminals, which may be referred to as point-to-multipoint (PTM) transmission. One terminal can be configured with both PTM and point to point (PTP) transmissions, as shown in FIG. 1.

In order to ensure reliability of data transmission, there are various retransmission mechanisms in unicast transmission. The basis of the unicast retransmission mechanism is that transmission channels and feedback channels are in one-to-one correspondence between a base station and a terminal, and different terminals have their own independent transmission channels and feedback channels.

PTM is point-to-multipoint transmission, and multiple terminals receive the same PDCP PDU, but in related art, it is impossible to ensure that each terminal successfully receives the PDCP PDU. Meanwhile, for multicast transmission, in the related art, there is no feedback channel available for the point-to-multipoint channel.

SUMMARY

The present disclosure provides a packet data convergence protocol status reporting method, a packet data convergence protocol status receiving method, a terminal and devices, which can realize reliable transmission of MBS services transmitted in PTM at a PDCP layer.

In order to solve the above technical problems, the technical solutions provided in embodiments of the present disclosure are as follows.

A packet data convergence protocol (PDCP) status reporting method, performed by a terminal which receives multicast and broadcast services (MBS) transmission, including:

in case of receiving the MBS, triggering to report a packet data convergence protocol (PDCP) status according to a preset condition;

transmitting a PDCP status report on a predetermined uplink channel.

Optionally, the preset condition includes at least one of the following:

when the terminal counts the number of packet data convergence protocol (PDCP) packet data unit (PDU) packet loss, and determines that the number of PDCP PDU packet loss reaches a preset threshold;

the terminal receives a PDCP status report poll transmitted by a network side;

when the terminal undergoes cell handover; or, the terminal receives an MBS service bearer reconfiguration message; wherein the reconfiguration message carries a data recovery indication, and the reconfiguration message includes reconfiguration from multicast PTM transmission to unicast PTP transmission, or MRB reconfiguration for multicast PTM transmission.

Optionally, the terminal receiving the PDCP status report poll transmitted by the network side, includes one of the following:

receiving a PDCP PDU transmitted by the network side on a multicast downlink channel, and obtaining a poll bit from the PDCP PDU; or, receiving a PDCP PDU transmitted by the network side on a unicast downlink channel, and obtaining a poll bit from the PDCP PDU.

Optionally, the PDCP status report poll transmitted to the terminal on the unicast downlink channel, includes:

PDCP status report poll for multicast PTM transmission; or,

PDCP status report poll for unicast PTP transmission; or, all PDCP status report poll for multicast PTM transmissions and unicast PTP transmissions.

Optionally, the predetermined uplink channel includes at least one of the following:

an uplink RLC AM channel corresponding to a downlink RLC AM on a network side in case that a downlink bearer of multicast PTM transmission is configured as radio link control (RLC) acknowledged mode (AM);

an uplink RLC UM channel corresponding to a downlink RLC UM on the network side in case that a downlink bearer of multicast PTM transmission is configured as radio link control (RLC) unacknowledged mode (UM); or, in case that a downlink bearer of multicast PTM transmission is configured as radio link control (RLC) unacknowledged mode (UM), for the MBS service, when multicast PTM and unicast PTP transmission modes are simultaneously configured for the terminal, an uplink RLC UM channel of PTP transmission mode.

Optionally, the PDCP status report includes: a sequence number of an unsuccessfully received PDCP PDU.

Optionally, the method further includes:

receiving retransmission of PDCP PDU transmitted by the network side on a multicast PTM transmission channel of MRB; or, receiving retransmission of PDCP PDU transmitted by the network side on a unicast PTP transmission channel of the MRB.

One embodiment of the present disclosure further provides a packet data convergence protocol (PDCP) status receiving method, performed by a network side, including:

receiving a packet data convergence protocol (PDCP) status report reported by a terminal according to a preset condition when the terminal receives the MBS; wherein the PDCP status report is transmitted on a predetermined uplink channel;

transmitting retransmission of PDCP PDU to the terminal.

Optionally, the preset condition includes at least one of the following:

when the terminal side counts the number of packet data convergence protocol (PDCP) packet data unit (PDU) packet loss, and determines that the number of PDCP PDU packet loss reaches a preset threshold;

the network side transmits a PDCP status report poll;

when the terminal undergoes cell handover; or, the network side configures MBS service bearer reconfiguration message; wherein the reconfiguration message carries a data recovery indication, and the reconfiguration message includes reconfiguration from multicast PTM transmission to unicast PTP transmission, or MRB reconfiguration for multicast PTM transmission.

Optionally, the network side transmitting the PDCP status report poll, includes one of the following:

transmitting, by the network side, PDCP PDU on a multicast downlink channel, wherein the PDCP PDUs include a polling bit;

transmitting, by the network side, the PDCP status report poll to the terminal on a unicast downlink channel, wherein the PDCP PDU includes a polling bit.

Optionally, the PDCP status report poll transmitted to the terminal on the unicast downlink channel, includes:

PDCP status report poll for multicast PTM transmission; or,

PDCP status report poll for unicast PTP transmission; or, all PDCP status report poll for multicast PTM transmissions and unicast PTP transmissions.

Optionally, the predetermined uplink channel includes at least one of the following:

an uplink RLC AM channel corresponding to a downlink RLC AM on the network side in case that a downlink bearer of multicast PTM transmission is configured as radio link control (RLC) acknowledged mode (AM);

an uplink RLC UM channel corresponding to a downlink RLC UM on the network side in case that a downlink bearer of multicast PTM transmission is configured as radio link control (RLC) unacknowledged mode (UM); or, in case that a downlink bearer of multicast PTM transmission is configured as radio link control (RLC) unacknowledged mode (UM), for the MB S service, when multicast PTM and unicast PTP transmission modes are simultaneously configured for the terminal, an uplink RLC UM channel of PTP transmission mode.

Optionally, the PDCP status report includes: a sequence number of an unsuccessfully received PDCP PDU.

Optionally, the transmitting retransmission of PDCP PDU to the terminal, includes:

transmitting retransmission of PDCP PDU through a multicast PTM transmission channel of the MRB; or, transmitting retransmission of PDCP PDU on a unicast PTP transmission channel of MRB, in the case that the MBS service is simultaneously mapped to multicast PTM and unicast PTP transmission.

One embodiment of the present disclosure further provides a terminal, including: a transceiver, a processor and a memory; wherein the memory stores a program executable by the processor, and the processor executes the program to perform: in case of receiving the MBS, triggering to report a packet data convergence protocol (PDCP) status according to a preset condition; transmitting a PDCP status report on a predetermined uplink channel.

Optionally, the preset condition includes at least one of the following:

when the terminal counts the number of packet data convergence protocol (PDCP) packet data unit (PDU) packet loss, and determines that the number of PDCP PDU packet loss reaches a preset threshold;

the terminal receives a PDCP status report poll transmitted by a network side;

when the terminal undergoes cell handover; or, the terminal receives an MBS service bearer reconfiguration message;

wherein the reconfiguration message carries a data recovery indication, and the reconfiguration message includes reconfiguration from multicast PTM transmission to unicast PTP transmission, or MRB reconfiguration for multicast PTM transmission.

One embodiment of the present disclosure further provides a packet data convergence protocol (PDCP) status reporting device in a terminal, including:

a processing module configured to, in case of receiving the MBS, trigger to report a packet data convergence protocol (PDCP) status according to a preset condition;

a transceiver module configured to transmit a PDCP status report on a predetermined uplink channel.

One embodiment of the present disclosure further provides a network device, including: a transceiver, a processor and a memory; wherein the memory stores a program executable by the processor, and the processor executes the program to perform: receiving a packet data convergence protocol (PDCP) status report reported by a terminal according to a preset condition when the terminal receives the MBS, wherein the PDCP status report is transmitted on a predetermined uplink channel; transmitting retransmission of PDCP PDU to the terminal.

Optionally, the preset condition includes at least one of the following:

when the terminal side counts the number of packet data convergence protocol (PDCP) packet data unit (PDU) packet loss, and determines that the number of PDCP PDU packet loss reaches a preset threshold;

the network side transmits a PDCP status report poll;

when the terminal undergoes cell handover; or, the network side configures MBS service bearer reconfiguration message; wherein the reconfiguration message carries a data recovery indication, and the reconfiguration message includes reconfiguration from multicast PTM transmission to unicast PTP transmission, or MRB reconfiguration for multicast PTM transmission.

One embodiment of the present disclosure further provides a packet data convergence protocol status receiving device in a network device, including:

a transceiver module configured to receive a packet data convergence protocol (PDCP) status report reported by a terminal according to a preset condition when the terminal receives the MBS, wherein the PDCP status report is transmitted on a predetermined uplink channel; transmit retransmission of PDCP PDU to the terminal.

One embodiment of the present disclosure further provides a processor-readable storage medium, including processor-executable instructions stored thereon; wherein the processor-executable instructions are configured to cause a processor to perform the above method.

The beneficial effects of the embodiments of the present disclosure are as follows.

In the embodiment of the present disclosure, in case of receiving the MBS, the terminal is triggered to report the PDCP status according to the preset condition, and transmits the PDCP status report to a base station on a designated uplink channel, thereby realizing reliable transmission of the MBS service transmitted in PTM at a PDCP layer.

BRIEF DESCRIPTION OF THE DRAWINGS

FIG. 11 is a schematic flowchart of a packet data convergence protocol status receiving method at a network side, according to an embodiment of the present disclosure;

FIG. 12 is a schematic diagram showing an architecture of a terminal according to an embodiment of the present disclosure; and FIG. 13 is a schematic diagram showing blocks of a device at a terminal side according to an embodiment of the present disclosure.

DETAILED DESCRIPTION

Figure 1:
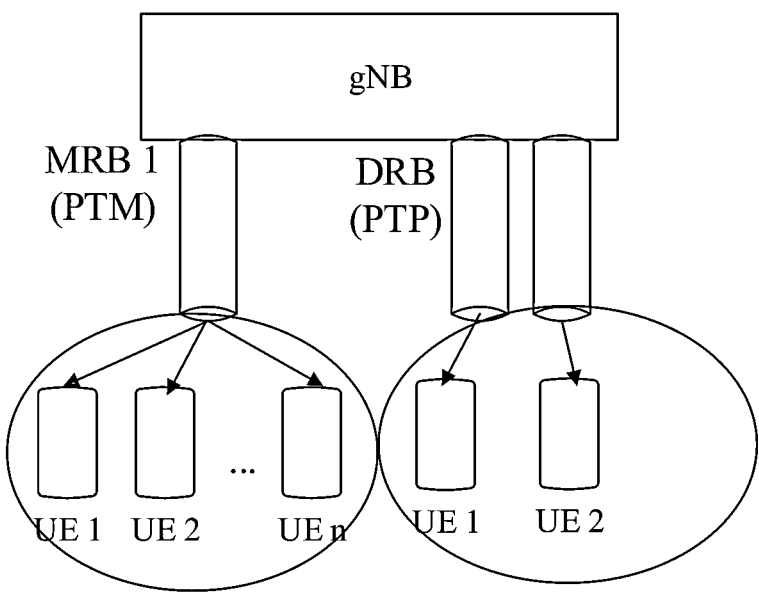
FIG. 1 is a schematic diagram showing transmission of MBS service.

Exemplary embodiments of the present disclosure will be described in details hereinafter with reference to the accompanying drawings. Although exemplary embodiments of the present disclosure are shown in the drawings, it is to be understood that the present disclosure may be embodied in various forms and should not be limited by the embodiments set forth herein. On the contrary, these embodiments are provided so that the present disclosure can be more thoroughly understood and fully convey the scope of the present disclosure to those skilled in the art.

Figure 2:
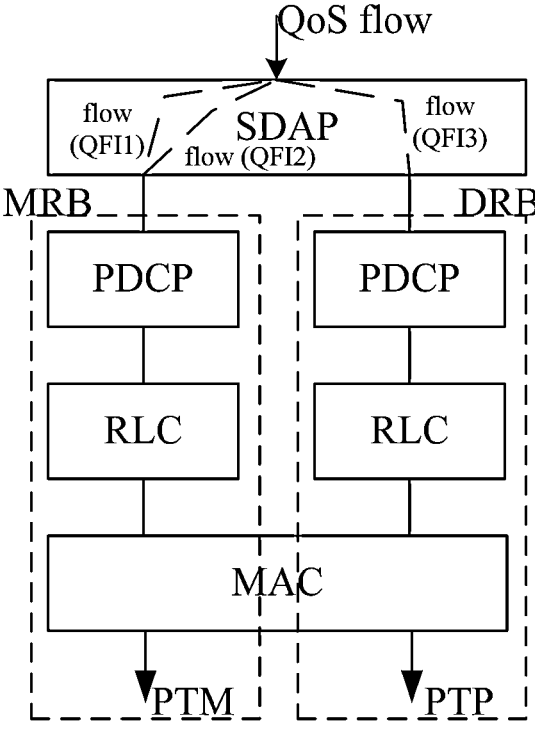
FIG. 2 is a schematic diagram of a first protocol stack architecture of a base station which supports both PTM and PTP.
Figure 3:
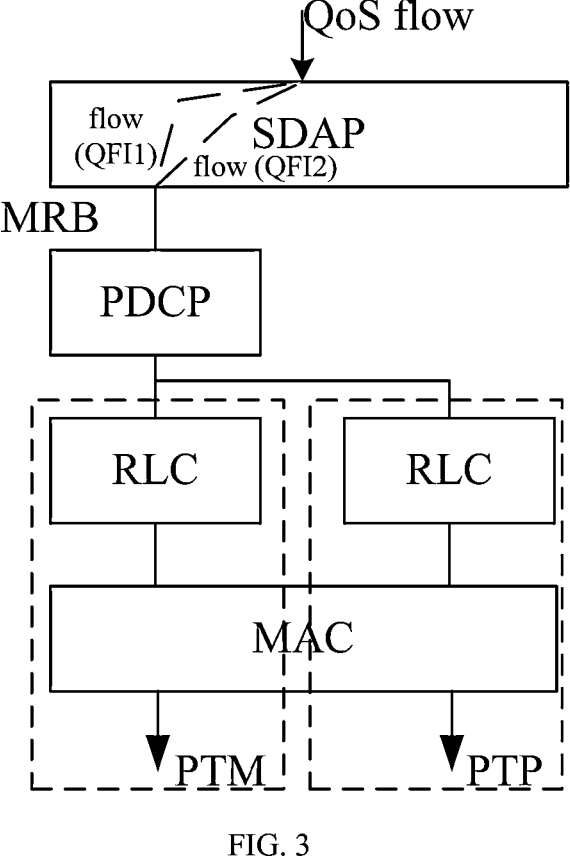
FIG. 3 is a schematic diagram of a second protocol stack architecture of a base station which supports both PTM and PTP.

As shown in FIG. 2 and FIG. 3, they show two protocol stack architectures of a base station which supports both PTM and PTP.

In FIG. 2, multicast and unicast are mapped to different radio bearers, and are transmitted through different packet data convergence protocol (PDCP) entities and different RLC entities.

In FIG. 3, an MBS service is mapped to a radio bearer MRB and passes through a PDCP entity, and then unicast and multicast are transmitted through different radio link control (RLC) entities and their corresponding logical channels. In FIG. 2 and FIG. 3, both unicast (PTP) and multicast (PTM) use different physical channels.

Figure 4:
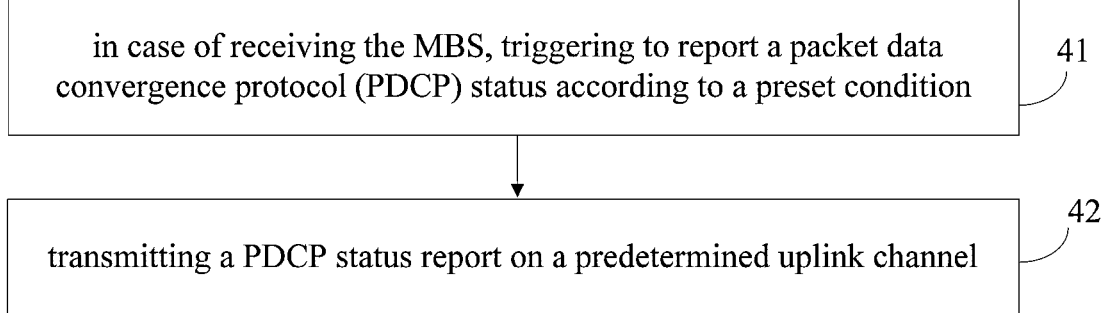
FIG. 4 is a schematic flowchart of a packet data convergence protocol status reporting method at a terminal side, according to the present disclosure.

As shown in FIG. 4, one embodiment of the present disclosure provides a packet data convergence protocol status reporting method, performed by a terminal side which receives multicast and broadcast services (MBS) transmission. The method includes:

Step 41: in case of receiving the MBS, triggering to report a packet data convergence protocol (PDCP) status according to a preset condition;

Step 42: transmitting a PDCP status report on a predetermined uplink channel.

In this embodiment of the present disclosure, in case of receiving the MBS, reporting of the PDCP status is triggered according to the preset condition, and the PDCP status report is transmitted on the predetermined uplink channel. That is, the terminal which receives the MBS transmission, is triggered to report the PDCP status according to the preset condition, and transmits the PDCP status report to a base station on a designated uplink channel, thereby realizing reliable transmission of the MBS service transmitted in PTM at a PDCP layer.

In one optional embodiment of the present disclosure, the preset condition includes at least one of the following:

1) when the terminal side counts the number of packet data convergence protocol (PDCP) packet data unit (PDU) packet loss, and determines that the number of PDCP PDU packet loss reaches a preset threshold;

2) the terminal side receives a PDCP status report poll transmitted by the network side;

3) when the terminal undergoes cell handover; or, 4) the terminal receives an MBS service bearer reconfiguration message; where the reconfiguration message carries a data recovery indication, and the reconfiguration message includes reconfiguration from multicast PTM transmission to unicast PTP transmission, or MRB reconfiguration for multicast PTM transmission.

For above item 1), the terminal side counts the number of correctly received PDCP PDUs, and triggers to report a PDCP status when the number of PDCP PDU packet loss reaches the preset threshold. The threshold may be configured by the base station, or specified by a protocol, or determined by the terminal itself. One method for counting the number of PDCP PDU packet loss may include: after the terminal performs reordering of received PDCP PDUs, counting the number of gaps of PDCP SN, or, within a certain period of time, counting the number of unsuccessfully received PDCP PDUs according to reception situation of RLC PDUs.

For above item 2), the base station side transmits the PDCP status report poll; the terminal side receives the PDCP status report poll transmitted by the network side.

Optionally, the terminal side receiving the PDCP status report poll transmitted by the network side, includes one of the following:

A) receiving a PDCP PDU transmitted by the network side on a multicast downlink channel, and obtaining a poll bit from the PDCP PDU;

Specifically, the PDCP PDU transmitted by the network side (such as the base station) in a broadcast manner, i.e., the PDCP PDU transmitted in PTM, includes the poll bit. Before this, the base station may configure for each terminal whether to respond to the PDCP poll from the base station side; only the terminal configured to respond to the poll from the base station, transmits a PDCP status report when receiving the poll; and other terminals do not need to respond, that is, other terminals do not need to transmits a PDCP status report.

B) receiving a PDCP PDU transmitted by the network side on a unicast downlink channel, and obtaining a poll bit from the PDCP PDU.

In one optional embodiment of the present disclosure, a PDCP status report poll transmitted to the terminal on the unicast downlink channel, includes:

PDCP status report poll for multicast PTM transmission; or,

PDCP status report poll for unicast PTP transmission; or, PDCP status report poll for all of multicast PTM transmissions and unicast PTP transmissions.

Specifically, the network side (such as the base station) transmits a poll to the terminal on the unicast downlink channel, i.e., PTP downlink channel. The polling can be further divided into: PDCP status report poll for PTM; PDCP status report poll for PTP; PDCP status report poll for all of PTM and PTP, i.e., the terminal is required to, for the same bearer, uniformly sort all PDCP PDUs transmitted by PTM and PTP and transmit a PDCP status report.

For above item 3), the base station side configures and instructs the terminal to transmit a PDCP status report when triggering handover.

For above item 4), the base station side configures and instructs that when MBS service bearer is reconfigured from PTM transmission to PTP transmission or when the MBS service transmitted by PTM is reconfigured (which includes reconfiguring a downlink transmission parameter, reconfiguring a corresponding uplink RLC channel), the terminal triggers to report a PDCP status.

In one optional embodiment of the present disclosure, the predetermined uplink channel includes at least one of the following:

11) an uplink RLC AM channel corresponding to a downlink RLC AM on the network side in case that a downlink bearer of multicast PTM transmission is configured as radio link control (RLC) acknowledged mode (AM).

Figure 5:
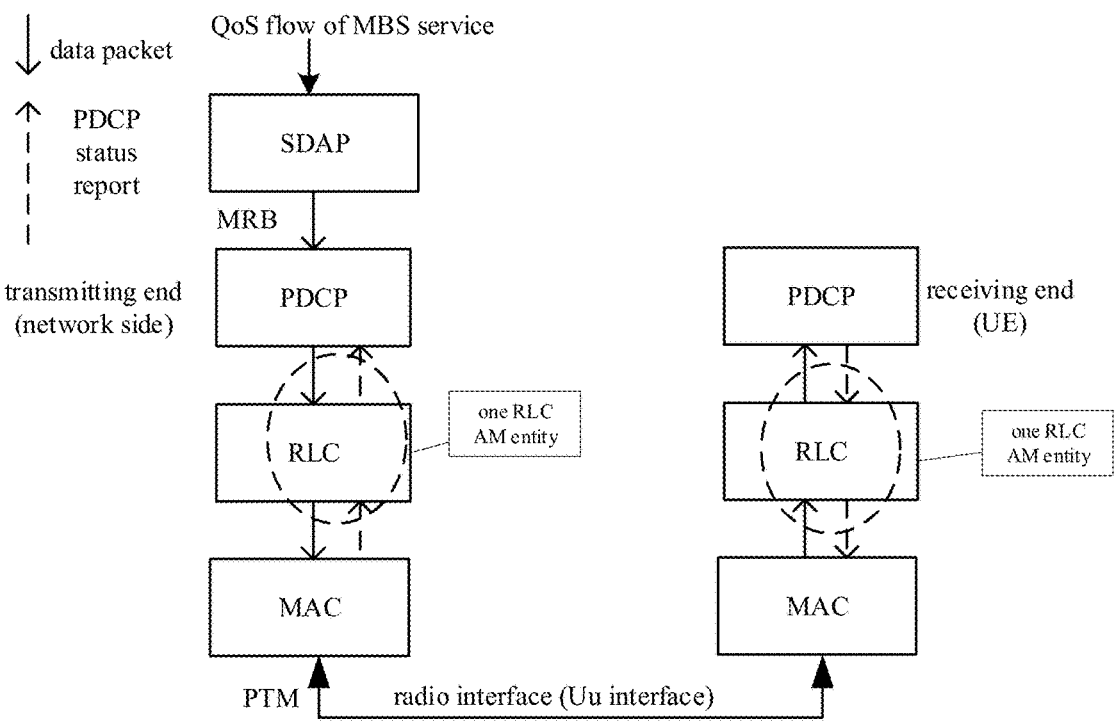
FIG. 5 is a schematic diagram showing that a terminal transmits a PDCP status report through an uplink RLC AM channel according to an embodiment of the present disclosure.

As shown in FIG. 5, a bearer corresponding to the PTM is configured as RLC AM; the base station configures, for each terminal, an uplink RLC AM channel corresponding to a downlink RLC AM channel. The terminal transmits the PDCP status report through the uplink RLC AM channel.

Figure 6:
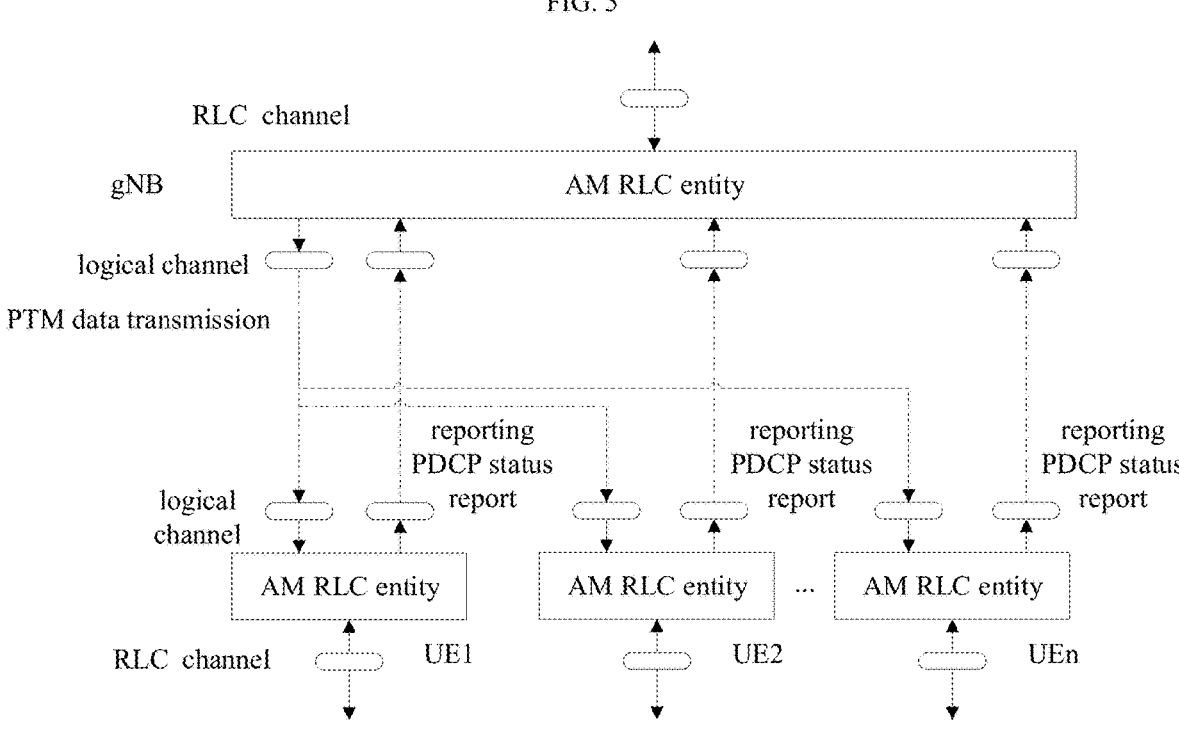
FIG. 6 is a schematic diagram showing that in multicast PTM transmission, an RLC layer is configured as an RLC channel for RLC AM, according to an embodiment of the present disclosure.

As shown in FIG. 6, it is a schematic diagram showing that in multicast PTM transmission, an RLC layer is configured as an RLC channel for RLC AM. Multiple terminals receive PTM transmission through a shared downlink RLC channel. Each terminal includes an RLC AM entity; the RLC AM entity is corresponding to one uplink RLC AM channel, and reports a PDCP status report through its own dedicated uplink RLC.

12) an uplink RLC UM channel corresponding to a downlink RLC UM on the network side in case that a downlink bearer of multicast PTM transmission is configured as radio link control (RLC) unacknowledged mode (UM).

Figure 7:
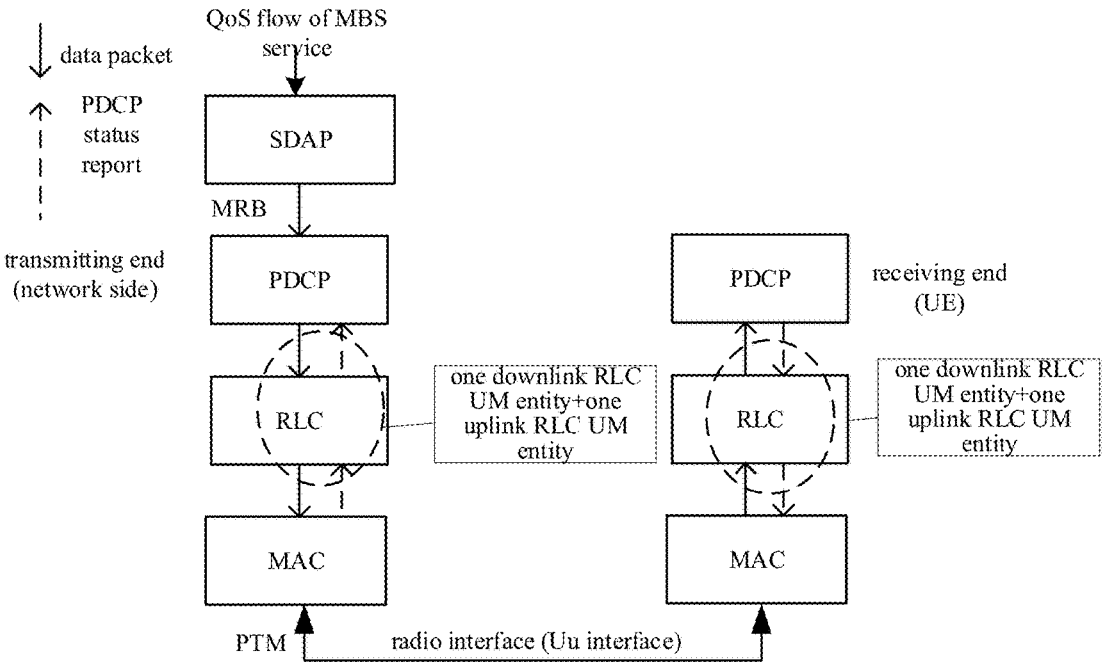
FIG. 7 is a schematic diagram showing that a terminal transmits a PDCP status report through an uplink RLC UM entity paired with a downlink RLC UM according to an embodiment of the present disclosure.

As shown in FIG. 7, a PTM downlink bearer is configured as RLC UM, and the base station configures, for a terminal that can transmits a PDCP status report, an uplink RLC UM entity paired with the downlink RLC UM, to transmit the PDCP status report.

Figure 8:
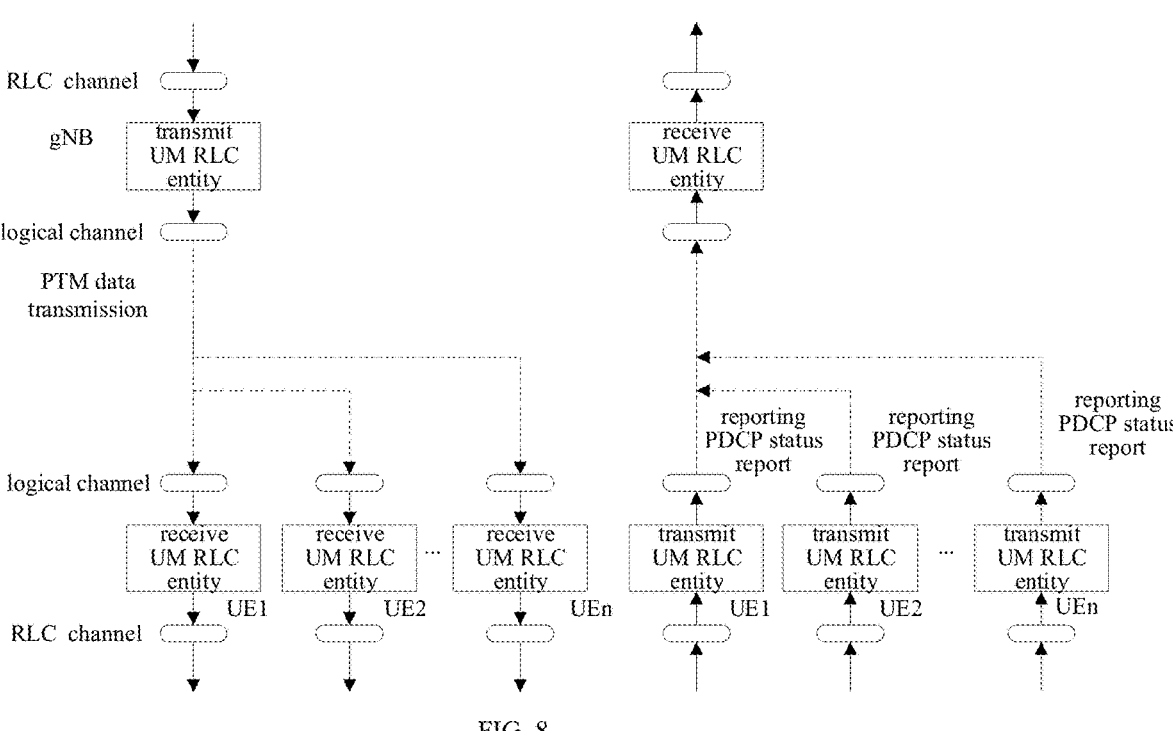
FIG. 8 is a schematic diagram showing that in multicast PTM transmission, an RLC layer is configured as an RLC channel for RLC UM, according to an embodiment of the present disclosure.

As shown in FIG. 8, it is a schematic diagram showing that in multicast PTM transmission, an RLC layer is configured as an RLC channel for RLC UM. The base station includes two RLC UM entities, which include one used to transmit downlink PTM transmission and other one used to receive a PDCP status report. Multiple terminals receive PTM transmissions through a shared downlink RLC channel. Each terminal includes two RLC UM entities; an RLC channel corresponding to one RLC UM entity is used to receive PTM transmission, and an uplink RLC channel corresponding to the other RLC UM entity is used to report a PDCP status report.

13) in case that a downlink bearer of multicast PTM transmission is configured as radio link control (RLC) unacknowledged mode (UM), for the MBS service, when multicast PTM and unicast PTP transmission modes are simultaneously configured for the terminal, an uplink RLC UM channel of PTP transmission mode.

Figure 9:
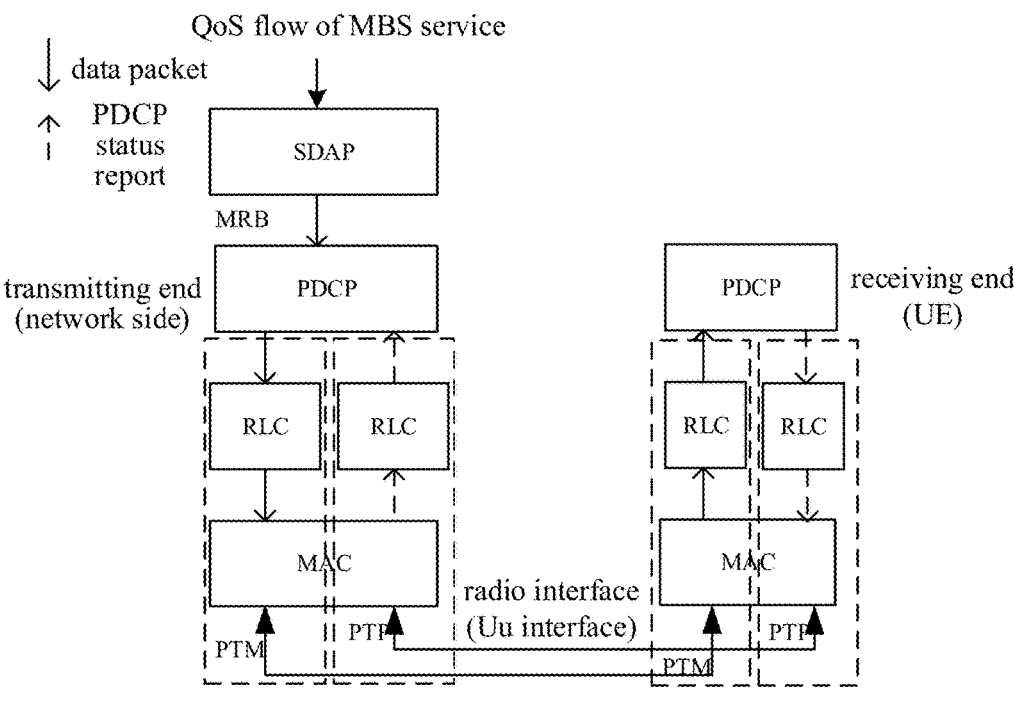
FIG. 9 is a schematic diagram showing that a terminal transmits a PDCP status report through an uplink RLC UM channel of a PTP transmission mode according to an embodiment of the present disclosure.

As shown in FIG. 9, the PTM downlink bearer is configured as RLC UM; for the MBS service, the base station configures both PTM and PTP transmission modes for the terminal, and the terminal transmits a PDCP status report through an uplink RLC UM channel of the PTP transmission mode.

Figure 10:
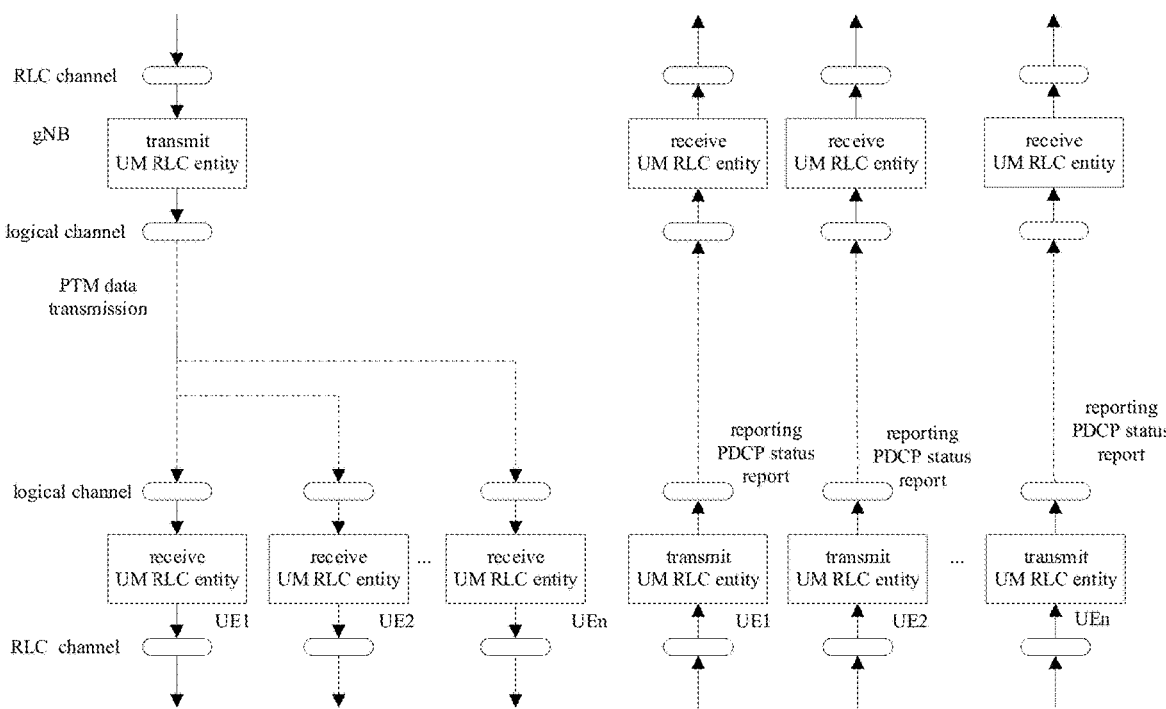
FIG. 10 is a schematic diagram showing transmission of a PDCP status report for multicast PTM transmission by using an RLC channel of unicast PTP according to an embodiment of the present disclosure.

As shown in FIG. 10, it is a schematic diagram showing transmission of a PDCP status report for multicast PTM transmission by using an RLC channel of unicast PTP. The base station includes an RLC UM entity, and RLC UM entities that are corresponding to terminals in a one-to-one manner for receiving the PDCP status reported by each terminal. Multiple terminals receive PTM transmission through a shared downlink RLC channel. Each terminal includes two RLC UM entities, an RLC channel corresponding to one RLC UM entity is used to receive the PTM transmission, and an uplink RLC channel corresponding to the other RLC UM entity is used to report the PDCP status report.

In one optional embodiment of the present disclosure, the PDCP status report includes: a sequence number of an unsuccessfully received PDCP PDU.

In one optional embodiment of the present disclosure, the packet data convergence protocol status reporting method further includes:

Step 43: receiving retransmission of PDCP PDU transmitted by the network side on a multicast PTM transmission channel of MRB; or, Step 44: receiving retransmission of PDCP PDU transmitted by the network side on a unicast PTP transmission channel of the MRB.

In the step 43, in specific implementation, after receiving the PDCP status report transmitted by the terminal, the base station adopts the PTM mode to transmit retransmission of the PDCP PDU through the downlink RLC channel and the physical layer channel of the PTM. The retransmission of the PDCP PDU may include directly retransmitting the PDCP PDU, or, restoring the PDCP PDU to a PDCP SDU and then encapsulating the PDCP SDU into a new PDCP PDU for transmission.

In the step 44, in specific implementation, after receiving the PDCP status report transmitted by the terminal, in case that the MBS service is mapped to both PTM and PTP transmissions and an error occurs in transmission of PDCP PDU in the PTM transmission mode corresponding to the MBS service, the base station adopts the PTP mode to transmit retransmission of the PDCP PDU through the downlink RLC channel and the physical layer channel of the PTP transmission corresponding to the MBS service. The retransmission of the PDCP PDU may include directly retransmitting the PDCP PDU, or, restoring the PDCP PDU to a PDCP SDU and then encapsulating the PDCP SDU into a new PDCP PDU for transmission.

Specific implementation process of the above method is described hereinafter in conjunction with specific embodiments.

Embodiment 1: An Implementation Manner in which the Terminal is Triggered to Report the PDCP Status by Counting the Number of Incorrectly Received PDCP PDUs In the embodiment 1, as shown in FIG. 5 or FIG. 7, the terminal transmits a PDCP status report through a dedicated uplink RLC channel which is configured by the base station and corresponding to a PTM downlink RLC channel.

The base station side configures a threshold for the number of wrong PDCP PDUs, which triggers to report the PDCP status (this step is optional). In case that the threshold for the number of wrong PDCP PDUs is specified by the protocol or is determined by the terminal itself, this step can be omitted. The base station receives the PDCP status report transmitted by the terminal through the uplink RLC channel corresponding to the PTM downlink RLC channel. According to PDCP PDUs not successfully received by the terminal in the PDCP status report, the base station retransmits PDCP PDUs that can be retransmitted. The PDCP PDUs that can be retransmitted refer to a PDCP PDU which still exists in the base station's cache, and/or a PDCP PDU whose PDCP discard timer has not expired. Specifically, retransmission of the PDCP PDU may be transmitted in a PTM manner or a PTP manner.

The terminal side receives the threshold for the number of wrong PDCP PDUs, which is transmitted by the base station side and triggers to report the PDCP status (this step is optional). In case that the threshold for the number of wrong PDCP PDUs is specified by the protocol or is determined by the terminal itself, this step can be omitted. The terminal counts the number of correctly received PDCP PDUs, and triggers to report PDCP status when the number of PDCP PDU packet loss reaches the threshold. One method for counting the number of PDCP PDU packet loss may include: after the terminal performs reordering of received PDCP PDUs, counting the number of gaps of PDCP SN, or, within a certain period of time, counting the number of unsuccessfully received PDCP PDUs according to reception situation of RLC PDUs. After triggering to report the PDCP status, the terminal encapsulates a sequence number (SN) of unsuccessfully received PDCP PDU into a PDCP status report, and then transmits the PDCP status report to the base station through the uplink RLC channel corresponding to the PTM downlink RLC channel. The terminal receives retransmission of the PDCP PDU transmitted by the base station side. The retransmission of the PDCP PDU may be transmitted in a PTM manner or a PTP manner.

Embodiment 2: Another Implementation Manner in which the Terminal is Triggered to Report the PDCP Status by Counting the Number of Incorrectly Received PDCP PDUs In the embodiment 2, as shown in FIG. 9, the terminal transmits a PDCP status report through an uplink RLC channel corresponding to the PTP downlink transmission.

The base station side configures a threshold for the number of wrong PDCP PDUs, which triggers to report the PDCP status (this step is optional). In case that the threshold for the number of wrong PDCP PDUs is specified by the protocol or is determined by the terminal itself, this step can be omitted. The base station receives the PDCP status report transmitted by the terminal through the uplink RLC channel corresponding to the PTP downlink RLC channel. According to PDCP PDUs not successfully received by the terminal in the PDCP status report, the base station retransmits PDCP PDUs that can be retransmitted. The PDCP PDUs that can be retransmitted refer to a PDCP PDU which still exists in the base station's cache, and/or a PDCP PDU whose PDCP discard timer has not expired. Specifically, retransmission of the PDCP PDU may be transmitted in a PTM manner or a PTP manner.

The terminal side receives the threshold for the number of wrong PDCP PDUs, which is transmitted by the base station side and triggers to report the PDCP status (this step is optional). In case that the threshold for the number of wrong PDCP PDUs is specified by the protocol or is determined by the terminal itself, this step can be omitted. The terminal counts the number of correctly received PDCP PDUs for an MBS service bearer, and triggers to report PDCP status when the number of PDCP PDU packet loss reaches the threshold. When the terminal counts the number of PDCP PDU packet loss, the terminal may only count the number of packet loss of PDCP PDUs received by the MBS service bearer through PTM, or count the number of packet loss of PDCP PDUs received by the MBS service bearer through both PTM and PTP. After triggering to report the PDCP status, the terminal encapsulates a sequence number (SN) of unsuccessfully received PDCP PDU into a PDCP status report, and then transmits the PDCP status report to the base station through the uplink RLC channel corresponding to the PTP downlink RLC channel. The terminal receives retransmission of the PDCP PDU transmitted by the base station side. The retransmission of the PDCP PDU may be transmitted in a PTM manner or a PTP manner.

Embodiment 3: An Implementation Manner in which the Terminal is Triggered to Report PDCP Status by a Poll from the Base Station In the embodiment 3, as shown in FIG. 5 or FIG. 7, the terminal transmits a PDCP status report through a dedicated uplink RLC channel which is configured by the base station and corresponding to a PTM downlink RLC channel.

The base station side configures whether the terminal is able to transmit a PDCP status report. Such configuration information may be configured in broadcast or multicast information for configuring the PTM, in this case, all terminals which receive the MBS service, need to send a status report; or such configuration information may be transmitted through downlink unicast signaling to the terminal, in this case, only terminals which receive an indication of allowing to transmit PDCP status report, can transmit the PDCP status report. The base station transmits a poll request to notify a terminal configured as above to transmit a PDCP status report. The poll request may be a one-bit indication included in the PDCP PDU. The base station receives the PDCP status report transmitted by the terminal through the uplink RLC channel corresponding to the PTM downlink RLC channel. According to PDCP PDUs not successfully received by the terminal in the PDCP status report, the base station retransmits PDCP PDUs that can be retransmitted. The PDCP PDUs that can be retransmitted refer to a PDCP PDU which still exists in the base station's cache, and/or a PDCP PDU whose PDCP discard timer has not expired. Specifically, retransmission of the PDCP PDU may be transmitted in a PTM manner or a PTP manner.

The terminal side receives information of whether the terminal is able to transmit a PDCP status report, which is configured by the base station. If it is determined that the terminal is able to transmit a PDCP status report, it will enter the next step. The terminal side receives the poll request transmitted by the base station. The terminal side is triggered to report PDCP status, encapsulates a sequence number (SN) of unsuccessfully received PDCP PDU into a PDCP status report, and then transmits the PDCP status report to the base station through the uplink RLC channel corresponding to the PTM downlink RLC channel. The terminal receives retransmission of the PDCP PDU transmitted by the base station side. The retransmission of the PDCP PDU may be transmitted in a PTM manner or a PTP manner.

Embodiment 4: Another Implementation Manner in which the Terminal is Triggered to Report PDCP Status by a Poll from the Base Station In the embodiment 4, as shown in FIG. 9, the terminal transmits a PDCP status report through an uplink RLC channel corresponding to the PTP downlink transmission.

The base station side configures whether the terminal is able to transmit a PDCP status report. Such configuration information may be configured in broadcast or multicast information for configuring the PTM, in this case, all terminals which receive the MBS service, need to send a status report; or such configuration information may be transmitted through downlink unicast signaling to the terminal, in this case, only terminals which receive an indication of allowing to transmit PDCP status report, can transmit the PDCP status report. The base station transmits a poll request to notify a terminal configured as above to transmit a PDCP status report. The poll request may be a one-bit indication included in the PDCP PDU. The base station receives the PDCP status report transmitted by the terminal through the uplink RLC channel corresponding to the PTP downlink RLC channel. According to PDCP PDUs not successfully received by the terminal in the PDCP status report, the base station retransmits PDCP PDUs that can be retransmitted. The PDCP PDUs that can be retransmitted refer to a PDCP PDU which still exists in the base station's cache, and/or a PDCP PDU whose PDCP discard timer has not expired. Specifically, retransmission of the PDCP PDU may be transmitted in a PTM manner or a PTP manner.

The terminal side receives information of whether the terminal is able to transmit a PDCP status report, which is configured by the base station. If it is determined that the terminal is able to transmit a PDCP status report, it will enter the next step. The terminal side receives the poll request transmitted by the base station. The terminal side is triggered to report PDCP status, encapsulates a sequence number (SN) of unsuccessfully received PDCP PDU into a PDCP status report, and then transmits the PDCP status report to the base station through the uplink RLC channel corresponding to the PTP downlink RLC channel. The terminal receives retransmission of the PDCP PDU transmitted by the base station side. The retransmission of the PDCP PDU may be transmitted in a PTM manner or a PTP manner.

Embodiment 5: An Implementation Manner in which the Terminal is Configured to be Triggered to Report PDCP Status During Handover In the embodiment 5, as shown in FIG. 5 or FIG. 7, the terminal transmits a PDCP status report through a dedicated uplink RLC channel which is configured by the base station and corresponding to a PTM downlink RLC channel.

The base station side configures whether the terminal needs to transmit a PDCP status report during handover. Such configuration information may be configured in broadcast or multicast information for configuring the PTM, in this case, all terminals which receive the MBS service, need to transmit a status report during handover; or such configuration information may be transmitted through downlink unicast signaling to the terminal, in this case, only terminals which receive an indication, need to transmit a status report during handover. The base station receives the PDCP status report transmitted by the terminal through the uplink RLC channel corresponding to the PTM downlink RLC channel. According to PDCP PDUs not successfully received by the terminal in the PDCP status report, the base station retransmits PDCP PDUs that can be retransmitted. The PDCP PDUs that can be retransmitted refer to a PDCP PDU which still exists in the base station's cache, and/or a PDCP PDU whose PDCP discard timer has not expired. Specifically, retransmission of the PDCP PDU may be transmitted in a PTM manner or a PTP manner.

The terminal side receives information of whether the terminal needs to transmit a PDCP status report during handover, which is configured by the base station. When the terminal undergoes cell handover, the terminal is triggered to report a PDCP status, encapsulates a sequence number (SN) of unsuccessfully received PDCP PDU into a PDCP status report, and then transmits the PDCP status report to the base station through the uplink RLC channel corresponding to the PTM downlink RLC channel. The terminal receives retransmission of the PDCP PDU transmitted by the base station side. The retransmission of the PDCP PDU may be transmitted in a PTM manner or a PTP manner.

Embodiment 6: Another Implementation Manner in which the Terminal is Configured to be Triggered to Report PDCP Status During Handover In the embodiment 6, as shown in FIG. 9, the terminal transmits a PDCP status report through an uplink RLC channel corresponding to the PTP downlink transmission.

The base station side configures whether the terminal needs to transmit a PDCP status report during handover. Such configuration information may be configured in broadcast or multicast information for configuring the PTM, in this case, all terminals which receive the MBS service, need to transmit a status report during handover; or such configuration information may be transmitted through downlink unicast signaling to the terminal, in this case, only terminals which receive an indication, need to transmit a status report during handover. The base station receives the PDCP status report transmitted by the terminal through the uplink RLC channel corresponding to the PTP downlink RLC channel. According to PDCP PDUs not successfully received by the terminal in the PDCP status report, the base station retransmits PDCP PDUs that can be retransmitted. The PDCP PDUs that can be retransmitted refer to a PDCP PDU which still exists in the base station's cache, and/or a PDCP PDU whose PDCP discard timer has not expired. Specifically, retransmission of the PDCP PDU may be transmitted in a PTM manner or a PTP manner.

The terminal side receives information of whether the terminal needs to transmit a PDCP status report during handover, which is configured by the base station. When the terminal undergoes cell handover, the terminal is triggered to report a PDCP status, encapsulates a sequence number (SN) of unsuccessfully received PDCP PDU into a PDCP status report, and then transmits the PDCP status report to the base station through the uplink RLC channel corresponding to the PTP downlink RLC channel. The terminal receives retransmission of the PDCP PDU transmitted by the base station side. The retransmission of the PDCP PDU may be transmitted in a PTM manner or a PTP manner.

Embodiment 7: An Implementation Manner in which Reporting of PDCP Status is Triggered by Reconfiguration of the MBS Service Bearer In the embodiment 7, as shown in FIG. 5 or FIG. 7, the terminal transmits a PDCP status report through a dedicated uplink RLC channel which is configured by the base station and corresponding to a PTM downlink RLC channel.

The base station side reconfiguring the MBS service bearer RB, includes: 1) still adopting PTM transmission, just reconfiguring some of parameters; 2) changing transmission mode of the RB from PTM to PTP; 3) changing transmission mode of the RB from PTP to PTM; 4) changing transmission mode of the RB from PTM to both PTM and PTP. When reconfiguring the service bearer, the base stations indicates that data recovery needs to be performed. The base station side receives the PDCP status report transmitted by the terminal through the uplink RLC channel corresponding to the original PTM downlink RLC channel, or receives the PDCP status report transmitted by the terminal through an uplink RLC channel corresponding to a newly configured PTM downlink RLC channel. According to PDCP PDUs not successfully received by the terminal in the PDCP status report, the base station retransmits PDCP PDUs that can be retransmitted, based on the new configuration of the MBS service bearer. The PDCP PDUs that can be retransmitted refer to a PDCP PDU which still exists in the base station's cache, and/or a PDCP PDU whose PDCP discard timer has not expired. Specifically, retransmission of the PDCP PDU may be transmitted in a PTM manner or a PTP manner.

The terminal side receives the base station's reconfiguration of the MBS service bearer RB. In case that the base station indicates that data recovery needs to be performed, the terminal is triggered to report a PDCP status. The terminal encapsulates a sequence number (SN) of unsuccessfully received PDCP PDU into a PDCP status report, and then transmits the PDCP status report to the base station through the uplink RLC channel corresponding to the original PTM downlink RLC channel or an uplink RLC channel corresponding to a newly configured PTM downlink RLC channel. Based on the new configuration of the MBS service bearer, the terminal receives retransmission of the PDCP PDU transmitted by the base station side. The retransmission of the PDCP PDU may be transmitted in a PTM manner or a PTP manner.

Embodiment 8: another implementation manner in which reporting of PDCP status is triggered by reconfiguration of the MBS service bearer. In the embodiment 8, as shown in FIG. 9, the terminal transmits a PDCP status report through an uplink RLC channel corresponding to the PTP downlink transmission.

The base station side reconfiguring the MBS service bearer RB, includes: 1) still adopting PTM transmission, just reconfiguring some of parameters; 2) changing transmission mode of the RB from PTM to PTP; 3) changing transmission mode of the RB from PTP to PTM; 4) changing transmission mode of the RB from PTM to both PTM and PTP. When reconfiguring the service bearer, the base stations indicates that data recovery needs to be performed. The base station side receives the PDCP status report transmitted by the terminal through the uplink RLC channel corresponding to the original PTP downlink RLC channel, or receives the PDCP status report transmitted by the terminal through an uplink RLC channel corresponding to a newly configured PTP downlink RLC channel. According to PDCP PDUs not successfully received by the terminal in the PDCP status report, the base station retransmits PDCP PDUs that can be retransmitted, based on the new configuration of the MBS service bearer. The PDCP PDUs that can be retransmitted refer to a PDCP PDU which still exists in the base station's cache, and/or a PDCP PDU whose PDCP discard timer has not expired. Specifically, retransmission of the PDCP PDU may be transmitted in a PTM manner or a PTP manner.

The terminal side receives the base station's reconfiguration of the MBS service bearer RB. In case that the base station indicates that data recovery needs to be performed, the terminal is triggered to report a PDCP status. The terminal encapsulates a sequence number (SN) of unsuccessfully received PDCP PDU into a PDCP status report, and then transmits the PDCP status report to the base station through the uplink RLC channel corresponding to the original PTP downlink RLC channel or an uplink RLC channel corresponding to a newly configured PTP downlink RLC channel. Based on the new configuration of the MBS service bearer, the terminal receives retransmission of the PDCP PDU transmitted by the base station side. The retransmission of the PDCP PDU may be transmitted in a PTM manner or a PTP manner.

In the above embodiments of the present disclosure, the terminal which receives the MBS multicast transmission, is triggered to report the PDCP status according to the determined condition, and transmits the PDCP status report to the base station on the designated uplink channel, thereby enabling reliable transmission of the MBS service transmitted in PTM at a PDCP layer.

As shown in FIG. 11, one embodiment of the present disclosure further provides a packet data convergence protocol status receiving method performed at a network side. The method includes:

Step 111: receiving a packet data convergence protocol (PDCP) status report reported by a terminal according to a preset condition when the terminal receives the MBS; where the PDCP status report is transmitted on a predetermined uplink channel;

Step 112: transmitting retransmission of PDCP PDU to the terminal.

Optionally, the preset condition includes at least one of the following:

when the terminal side counts the number of packet data convergence protocol (PDCP) packet data unit (PDU) packet loss, and determines that the number of PDCP PDU packet loss reaches a preset threshold; the network side transmits a PDCP status report poll;

when the terminal undergoes cell handover; or, the network side configures MBS service bearer reconfiguration message; where the reconfiguration message carries a data recovery indication, and the reconfiguration message includes reconfiguration from multicast PTM transmission to unicast PTP transmission, or MRB reconfiguration for multicast PTM transmission.

Optionally, the network side transmitting the PDCP status report poll, includes one of the following:

the network side transmits PDCP PDU on a multicast downlink channel, where the PDCP PDUs include a polling bit;

the network side transmits the PDCP status report poll to the terminal on a unicast downlink channel, where the PDCP PDU includes a polling bit.

Optionally, transmitting the PDCP status report poll to the terminal on the unicast downlink channel, includes:

PDCP status report poll for multicast PTM transmission; or,

PDCP status report poll for unicast PTP transmission; or,

PDCP status report poll for all of multicast PTM transmissions and unicast PTP transmissions.

Optionally, the predetermined uplink channel includes at least one of the following:

an uplink RLC AM channel corresponding to a downlink RLC AM on the network side in case that a downlink bearer of multicast PTM transmission is configured as radio link control (RLC) acknowledged mode (AM);

an uplink RLC UM channel corresponding to a downlink RLC UM on the network side in case that a downlink bearer of multicast PTM transmission is configured as radio link control (RLC) unacknowledged mode (UM); or, in case that a downlink bearer of multicast PTM transmission is configured as radio link control (RLC) unacknowledged mode (UM), for the MB S service, when multicast PTM and unicast PTP transmission modes are simultaneously configured for the terminal, an uplink RLC UM channel of PTP transmission mode.

Optionally, the PDCP status report includes: a sequence number of an unsuccessfully received PDCP PDU.

Optionally, the transmitting retransmission of PDCP PDU to the terminal, includes: transmitting retransmission of PDCP PDU through a multicast PTM transmission channel of the MRB; or, transmitting retransmission of PDCP PDU on a unicast PTP transmission channel of MRB, in the case that the MBS service is simultaneously mapped to multicast PTM and unicast PTP transmission.

It is to be noted that this method is a method on the network side corresponding to the method on the terminal side described above, and all the implementation manners of the above method are applicable to this embodiment, and the same technical effect can also be achieved.

As shown in FIG. 12, one embodiment of the present disclosure provides a terminal 120, which includes: a transceiver 121, a processor 122 and a memory 123. The memory 123 stores a program executable by the processor 123. The processor 122 executes the program to perform: in case of receiving the MBS, triggering to report a packet data convergence protocol (PDCP) status according to a preset condition; transmitting a PDCP status report on a predetermined uplink channel.

Optionally, the preset condition includes at least one of the following:

when the terminal side counts the number of packet data convergence protocol (PDCP) packet data unit (PDU)

packet loss, and determines that the number of PDCP PDU packet loss reaches a preset threshold;

the terminal side receives a PDCP status report poll transmitted by the network side;

when the terminal undergoes cell handover; or, the terminal receives an MBS service bearer reconfiguration message; where the reconfiguration message carries a data recovery indication, and the reconfiguration message includes reconfiguration from multicast PTM transmission to unicast PTP transmission, or MRB reconfiguration for multicast PTM transmission.

Optionally, the terminal side receiving the PDCP status report poll transmitted by the network side, includes one of the following:

receiving a PDCP PDU transmitted by the network side on a multicast downlink channel, and obtaining a poll bit from the PDCP PDU; or, receiving a PDCP PDU transmitted by the network side on a unicast downlink channel, and obtaining a poll bit from the PDCP PDU.

Optionally, the PDCP status report poll transmitted to the terminal on the unicast downlink channel, includes:

PDCP status report poll for multicast PTM transmission; or,

PDCP status report poll for unicast PTP transmission; or,

PDCP status report poll for all of multicast PTM transmissions and unicast PTP transmissions.

Optionally, the predetermined uplink channel includes at least one of the following:

an uplink RLC AM channel corresponding to a downlink RLC AM on the network side in case that a downlink bearer of multicast PTM transmission is configured as radio link control (RLC) acknowledged mode (AM);

an uplink RLC UM channel corresponding to a downlink RLC UM on the network side in case that a downlink bearer of multicast PTM transmission is configured as radio link control (RLC) unacknowledged mode (UM); or, in case that a downlink bearer of multicast PTM transmission is configured as radio link control (RLC) unacknowledged mode (UM), for the MBS service, when multicast PTM and unicast PTP transmission modes are simultaneously configured for the terminal, an uplink RLC UM channel of PTP transmission mode.

Optionally, the PDCP status report includes: a sequence number of an unsuccessfully received PDCP PDU.

Optionally, the transceiver 91 is further configured to: receive retransmission of PDCP PDU transmitted by the network side on a multicast PTM transmission channel of MRB; or, receive retransmission of PDCP PDU transmitted by the network side on a unicast PTP transmission channel of the MRB.

It is to be noted that the terminal in this embodiment is a terminal corresponding to the method shown in FIG. 4, and the implementation manners in the above embodiments are all applicable to the embodiments of the terminal, and the same technical effect can also be achieved. It is to be noted here that the above terminal provided in the embodiments of the present disclosure can implement all the method steps implemented in the above method embodiments, and can achieve the same technical effect. The parts and beneficial effects in this embodiment that are the same as those in the method embodiment will not be described in detail here.

As shown in FIG. 13, one embodiment of the present disclosure further provides a packet data convergence protocol status reporting device 130 in a terminal. The device 130 includes:

a processing module 132 configured to, in case of receiving the MBS, trigger to report a packet data convergence protocol (PDCP) status according to a preset condition;

a transceiver module 131 configured to transmit a PDCP status report on a predetermined uplink channel.

Optionally, the preset condition includes at least one of the following:

when the terminal side counts the number of packet data convergence protocol (PDCP) packet data unit (PDU) packet loss, and determines that the number of PDCP PDU packet loss reaches a preset threshold;

the terminal side receives a PDCP status report poll transmitted by the network side;

when the terminal undergoes cell handover; or, the terminal receives an MBS service bearer reconfiguration message; where the reconfiguration message carries a data recovery indication, and the reconfiguration message includes reconfiguration from multicast PTM transmission to unicast PTP transmission, or MRB reconfiguration for multicast PTM transmission.

Optionally, the terminal side receiving the PDCP status report poll transmitted by the network side, includes one of the following:

receiving a PDCP PDU transmitted by the network side on a multicast downlink channel, and obtaining a poll bit from the PDCP PDU; or, receiving a PDCP PDU transmitted by the network side on a unicast downlink channel, and obtaining a poll bit from the PDCP PDU.

Optionally, the PDCP status report poll transmitted to the terminal on the unicast downlink channel, includes:

PDCP status report poll for multicast PTM transmission; or,

PDCP status report poll for unicast PTP transmission; or,

PDCP status report poll for all of multicast PTM transmissions and unicast PTP transmissions.

Optionally, the predetermined uplink channel includes at least one of the following:

an uplink RLC AM channel corresponding to a downlink RLC AM on the network side in case that a downlink bearer of multicast PTM transmission is configured as radio link control (RLC) acknowledged mode (AM);

an uplink RLC UM channel corresponding to a downlink RLC UM on the network side in case that a downlink bearer of multicast PTM transmission is configured as radio link control (RLC) unacknowledged mode (UM); or, in case that a downlink bearer of multicast PTM transmission is configured as radio link control (RLC) unacknowledged mode (UM), for the MB S service, when multicast PTM and unicast PTP transmission modes are simultaneously configured for the terminal, an uplink RLC UM channel of PTP transmission mode.

Optionally, the PDCP status report includes: a sequence number of an unsuccessfully received PDCP PDU.

Optionally, the transceiver module 131 configured to: receive retransmission of PDCP PDU transmitted by the network side on a multicast PTM transmission channel of MRB; or, receive retransmission of PDCP PDU transmitted by the network side on a unicast PTP transmission channel of the MRB.

It is to be noted that the terminal in this embodiment is a terminal corresponding to the method shown in FIG. 4, and the implementation manners in the above embodiments are all applicable to the embodiments of the terminal, and the same technical effect can also be achieved. It is to be noted here that the above terminal provided in the embodiments of the present disclosure can implement all the method steps implemented in the above method embodiments, and can achieve the same technical effect. The parts and beneficial effects in this embodiment that are the same as those in the method embodiment will not be described in detail here.

One embodiment of the present disclosure further provides a network device, including: a transceiver, a processor and a memory. The memory stores a program executable by the processor. The processor executes the program to perform: receiving a packet data convergence protocol (PDCP) status report reported by a terminal according to a preset condition when the terminal receives the MBS; where the PDCP status report is transmitted on a predetermined uplink channel; transmitting retransmission of PDCP PDU to the terminal.

Optionally, the preset condition includes at least one of the following:

when the terminal side counts the number of packet data convergence protocol (PDCP) packet data unit (PDU) packet loss, and determines that the number of PDCP PDU packet loss reaches a preset threshold;

the network side transmits a PDCP status report poll;

when the terminal undergoes cell handover; or, the network side configures MBS service bearer reconfiguration message; where the reconfiguration message carries a data recovery indication, and the reconfiguration message includes reconfiguration from multicast PTM transmission to unicast PTP transmission, or MRB reconfiguration for multicast PTM transmission.

Optionally, the network side transmitting the PDCP status report poll, includes one of the following:

the network side transmits PDCP PDU on a multicast downlink channel, where the PDCP PDUs include a polling bit;

the network side transmits the PDCP status report poll to the terminal on a unicast downlink channel, where the PDCP PDU includes a polling bit.

Optionally, transmitting the PDCP status report poll to the terminal on the unicast downlink channel, includes:

PDCP status report poll for multicast PTM transmission; or,

PDCP status report poll for unicast PTP transmission; or,

PDCP status report poll for all of multicast PTM transmissions and unicast PTP transmissions.

Optionally, the predetermined uplink channel includes at least one of the following:

an uplink RLC AM channel corresponding to a downlink RLC AM on the network side in case that a downlink bearer of multicast PTM transmission is configured as radio link control (RLC) acknowledged mode (AM);

an uplink RLC UM channel corresponding to a downlink RLC UM on the network side in case that a downlink bearer of multicast PTM transmission is configured as radio link control (RLC) unacknowledged mode (UM); or, in case that a downlink bearer of multicast PTM transmission is configured as radio link control (RLC) unacknowledged mode (UM), for the MB S service, when multicast PTM and unicast PTP transmission modes are simultaneously configured for the terminal, an uplink RLC UM channel of PTP transmission mode.

Optionally, the PDCP status report includes: a sequence number of an unsuccessfully received PDCP PDU.

Optionally, the transmitting retransmission of PDCP PDU to the terminal, includes: transmitting retransmission of PDCP PDU through a multicast PTM transmission channel of the MRB; or, transmitting retransmission of PDCP PDU on a unicast PTP transmission channel of MRB, in the case that the MBS service is simultaneously mapped to multicast PTM and unicast PTP transmission.

It is to be noted that the network device in this embodiment is a network device corresponding to the method shown in FIG. 8, and the implementation manners in the above embodiments are all applicable to the embodiments of the network device, and the same technical effect can also be achieved. It is to be noted here that the above network device provided in the embodiments of the present disclosure can implement all the method steps implemented in the above method embodiments, and can achieve the same technical effect. The parts and beneficial effects in this embodiment that are the same as those in the method embodiment will not be described in detail here.

One embodiment of the present disclosure further provides a packet data convergence protocol status receiving device in a network device. The device includes:

a transceiver module configured to receive a packet data convergence protocol (PDCP) status report reported by a terminal according to a preset condition when the terminal receives the MBS; where the PDCP status report is transmitted on a predetermined uplink channel; transmit retransmission of PDCP PDU to the terminal.

Optionally, the preset condition includes at least one of the following:

when the terminal side counts the number of packet data convergence protocol (PDCP) packet data unit (PDU) packet loss, and determines that the number of PDCP PDU packet loss reaches a preset threshold;

the network side transmits a PDCP status report poll;

when the terminal undergoes cell handover; or, the network side configures MBS service bearer reconfiguration message; where the reconfiguration message carries a data recovery indication, and the reconfiguration message includes reconfiguration from multicast PTM transmission to unicast PTP transmission, or MRB reconfiguration for multicast PTM transmission.

Optionally, the network side transmitting the PDCP status report poll, includes one of the following:

the network side transmits PDCP PDU on a multicast downlink channel, where the PDCP PDUs include a polling bit;

the network side transmits the PDCP status report poll to the terminal on a unicast downlink channel, where the PDCP PDU includes a polling bit.

Optionally, the PDCP status report poll transmitted to the terminal on the unicast downlink channel, includes:

PDCP status report poll for multicast PTM transmission; or,

PDCP status report poll for unicast PTP transmission; or,

PDCP status report poll for all of multicast PTM transmissions and unicast PTP transmissions.

Optionally, the predetermined uplink channel includes at least one of the following:

an uplink RLC AM channel corresponding to a downlink RLC AM on the network side in case that a downlink bearer of multicast PTM transmission is configured as radio link control (RLC) acknowledged mode (AM);

an uplink RLC UM channel corresponding to a downlink RLC UM on the network side in case that a downlink bearer of multicast PTM transmission is configured as radio link control (RLC) unacknowledged mode (UM); or, in case that a downlink bearer of multicast PTM transmission is configured as radio link control (RLC) unacknowledged mode (UM), for the MB S service, when multicast PTM and unicast PTP transmission modes are simultaneously configured for the terminal, an uplink RLC UM channel of PTP transmission mode.

Optionally, the PDCP status report includes: a sequence number of an unsuccessfully received PDCP PDU.

Optionally, the transmitting retransmission of PDCP PDU to the terminal, includes: transmitting retransmission of PDCP PDU through a multicast PTM transmission channel of the MRB; or, transmitting retransmission of PDCP PDU on a unicast PTP transmission channel of MRB, in the case that the MBS service is simultaneously mapped to multicast PTM and unicast PTP transmission.

It is to be noted that the network device in this embodiment is a network device corresponding to the method shown in FIG. 8, and the implementation manners in the above embodiments are all applicable to the embodiments of the network device, and the same technical effect can also be achieved. It is to be noted here that the above network device provided in the embodiments of the present disclosure can implement all the method steps implemented in the above method embodiments, and can achieve the same technical effect. The parts and beneficial effects in this embodiment that are the same as those in the method embodiment will not be described in detail here.

One embodiment of the present disclosure further provides a processor-readable storage medium. The processor-readable storage medium stores processor-executable instructions for causing the processor to perform the above method. All the implementation manners in the foregoing method embodiments are applicable to this embodiment, and the same technical effect can also be achieved.

Persons having ordinary skill in the art may obtain that, taking into account various embodiments of the present disclosure, units and algorithm blocks described in each example may be implemented by electronic hardware, or in a combination of computer software and electronic hardware. Whether these functions are implemented by using hardware or software depends on specific application, and design constraints of the technical solution. A skilled person may adopt different methods to implement described functions of each specific application, but such implementation should not be considered to extend beyond the scope of the present disclosure.

Persons having ordinary skill in the art may clearly understand that, for convenient and concise of the description, specific work process of foregoing system, device and unit may refer to a corresponding process in method embodiments, which are not repeated here.

In the embodiments provided in the present application, it should be understood that the disclosed device and method may be realized by other modes. For example, the device embodiment described above is only illustrative, for example, the units are divided according to the logical function and can be divided in other modes in fact. For instance, multiple units or components can be combined with or can be integrated into another system, or some characteristics can be ignored, or are not executed. On the other hand, the coupling or direct coupling or communication connection shown or discussed among each other may be indirect coupling or communication connection through some interfaces, devices or units, which may be electrical, mechanical or in other forms.

The units described above as separation units may or may not be physically separated, and the components displayed as the units may or may not be the physical units. The units can be located in one place or distributed to multiple network units. Partial or all of these units may be selected according to actual requirements to realize the purpose of the solutions in embodiments of the present disclosure.

Further, each function unit in each embodiment of the present disclosure may be integrated into one processing unit, each unit may be set in a separate physical location, or two or more than two units may be integrated into one unit.

When the functions are implemented in the form of a software functional unit, and sold or used as an independent product, such software functional unit may be stored in a computer readable storage medium. On the basis of such understanding, essence of technical solution in the present disclosure, or a part thereof contributing to the existing technology, or just a part of the technical solution may be demonstrated with a software product. The computer software product is stored in a storage medium, which includes several instructions to enable a computer device (which may be a Personal Computer (PC), a server, or a network device, and so on) to execute all the blocks, or some blocks in a method of each embodiment in the present disclosure. The foregoing storage medium includes a U disk, a mobile hard disk, a Read-Only Memory (ROM), a Random Access Memory (RAM), a disk, or a Compact Disk (CD), or various mediums which may store program codes.

In addition, it should be noted that in the devices and methods of the present disclosure, apparently, each component or each step may be decomposed and/or recombined. These decomposition and/or recombination should be regarded as equivalent solutions of the present disclosure. In addition, the steps of performing the above series of processing may be performed naturally in chronological order in the order of description, but do not necessarily need to be performed in chronological order, and some steps may be performed in parallel or independently of each other. Those of ordinary skill in the art can understand that all or any of the steps or components of the method and device of the present disclosure may be implemented in hardware, firmware, software or a combination thereof in any computing device (including processor, storage medium, etc.) or network of computing devices, which can be achieved by those of ordinary skill in the art with their basic programming skills after reading the description of the present disclosure.

Therefore, the object of the present disclosure may also be achieved by running a program or a set of programs on any computing device. The computing device may be a well-known universal device. Therefore, the object of the present disclosure may also be achieved only by providing a program product containing program codes for implementing the method or device. In other words, such a program product also constitutes the present disclosure, and a storage medium storing such a program product also constitutes the present disclosure. Apparently, the storage medium may be any known storage medium or any storage medium developed in the future. It should also be noted that in the devices and methods of the present disclosure, apparently, each component or each step may be decomposed and/or recombined. These decomposition and/or recombination should be regarded as equivalent solutions of the present disclosure. In addition, the steps of performing the above series of processing may be performed naturally in chronological order in the order of description, but do not necessarily need to be performed in chronological order, and some steps may be performed in parallel or independently of each other.

The above are optional embodiments of the present disclosure. It should be pointed out that, for persons having ordinary skill in the art, several improvements and changes may be made, without departing from the principle of the present disclosure. These improvements and changes should also be within the scope of the present disclosure.

What is claimed is:

1. A packet data convergence protocol (PDCP) status reporting method, performed by a terminal, comprising:
in case of receiving multicast and broadcast services (MBS), triggering to report a PDCP status according to a preset condition;
transmitting a PDCP status report on a predetermined uplink channel;
wherein the preset condition includes at least one of the following:
the terminal receives a PDCP status report poll transmitted by a network side;
when the terminal undergoes cell handover; or,
the terminal receives an MBS service bearer reconfiguration message; wherein the reconfiguration message carries a data recovery indication, and the reconfiguration message includes reconfiguration from multicast point-to-multipoint (PTM) transmission to unicast point-to-point (PTP) transmission, or MBS Radio Bearer (MRB) reconfiguration for multicast PTM transmission.

2. The method according to claim 1, wherein the terminal receiving the PDCP status report poll transmitted by the network side, includes one of the following:
receiving a PDCP protocol data unit (PDU) transmitted by the network side on a multicast downlink channel, and obtaining a poll bit from the PDCP PDU; or,
receiving a PDCP PDU transmitted by the network side on a unicast downlink channel, and obtaining a poll bit from the PDCP PDU.

3. The method according to claim 2, wherein the PDCP status report poll transmitted to the terminal on the unicast downlink channel, includes:
PDCP status report poll for multicast PTM transmission; or,
PDCP status report poll for unicast PTP transmission; or,
all PDCP status report poll for multicast PTM transmissions and unicast PTP transmissions.

4. The method according to claim 1, wherein the predetermined uplink channel includes at least one of the following:
an uplink RLC AM channel corresponding to a downlink RLC AM on a network side in case that a downlink bearer of multicast PTM transmission is configured as radio link control (RLC) acknowledged mode (AM);
an uplink RLC UM channel corresponding to a downlink RLC UM on the network side in case that a downlink bearer of multicast PTM transmission is configured as radio link control (RLC) unacknowledged mode (UM); or,
in case that a downlink bearer of multicast PTM transmission is configured as radio link control (RLC) unacknowledged mode (UM), for the MBS service, when multicast PTM and unicast PTP transmission modes are simultaneously configured for the terminal, an uplink RLC UM channel of PTP transmission mode.

5. The method according to claim 1, wherein the PDCP status report includes: a sequence number of an unsuccessfully received PDCP PDU.

6. The method according to claim 1, wherein the method further includes:

receiving retransmission of PDCP PDU transmitted by the network side on a multicast PTM transmission channel of MRB; or, receiving retransmission of PDCP PDU transmitted by the network side on a unicast PTP transmission channel of the MRB.

7. A packet data convergence protocol (PDCP) status receiving method, performed by a network side, comprising:

receiving a PDCP status report reported by a terminal according to a preset condition when the terminal receives multicast and broadcast services (MBS); wherein the PDCP status report is transmitted on a predetermined uplink channel;

transmitting retransmission of PDCP protocol data unit (PDU) to the terminal;

wherein the preset condition includes at least one of the following:

the network side transmits a PDCP status report poll;

when the terminal undergoes cell handover; or, the network side configures MBS service bearer reconfiguration message; wherein the reconfiguration message carries a data recovery indication, and the reconfiguration message includes reconfiguration from multicast point-to-multipoint (PTM) transmission to unicast point-to-point (PTP) transmission, or MBS Radio Bearer (MRB) reconfiguration for multicast PTM transmission.

8. The method according to claim 7, wherein the network side transmitting the PDCP status report poll, includes one of the following:

transmitting, by the network side, PDCP PDU on a multicast downlink channel, wherein the PDCP PDUs include a polling bit;

transmitting, by the network side, the PDCP status report poll to the terminal on a unicast downlink channel, wherein the PDCP PDU includes a polling bit.

9. The method according to claim 8, wherein the PDCP status report poll transmitted to the terminal on the unicast downlink channel, includes:

PDCP status report poll for multicast PTM transmission; or,

PDCP status report poll for unicast PTP transmission; or, all PDCP status report poll for multicast PTM transmissions and unicast PTP transmissions.

10. The method according to claim 7, wherein the predetermined uplink channel includes at least one of the following:

an uplink RLC AM channel corresponding to a downlink RLC AM on the network side in case that a downlink bearer of multicast PTM transmission is configured as radio link control (RLC) acknowledged mode (AM);

an uplink RLC UM channel corresponding to a downlink RLC UM on the network side in case that a downlink bearer of multicast PTM transmission is configured as radio link control (RLC) unacknowledged mode (UM); or, in case that a downlink bearer of multicast PTM transmission is configured as radio link control (RLC) unacknowledged mode (UM), for the MBS service, when multicast PTM and unicast PTP transmission modes are simultaneously configured for the terminal, an uplink RLC UM channel of PTP transmission mode.

11. The method according to claim 7, wherein the PDCP status report includes: a sequence number of an unsuccessfully received PDCP PDU.

12. The method according to claim 7, wherein the transmitting retransmission of PDCP PDU to the terminal, includes:

transmitting retransmission of PDCP PDU through a multicast PTM transmission channel of the MRB; or, transmitting retransmission of PDCP PDU on a unicast PTP transmission channel of MRB, in the case that the MBS service is simultaneously mapped to multicast PTM and unicast PTP transmission.

13. A terminal, comprising: a transceiver, a processor and a memory; wherein the memory stores a program executable by the processor, and the processor executes the program to perform: in case of receiving multicast and broadcast services (MBS), triggering to report a packet data convergence protocol (PDCP) status according to a preset condition; transmitting a PDCP status report on a predetermined uplink channel;

wherein the preset condition includes at least one of the following:

the terminal receives a PDCP status report poll transmitted by a network side;

when the terminal undergoes cell handover; or, the terminal receives an MBS service bearer reconfiguration message; wherein the reconfiguration message carries a data recovery indication, and the reconfiguration message includes reconfiguration from multicast point-to-multipoint (PTM) transmission to unicast point-to-point (PTP) transmission, or MBS Radio Bearer (MRB) reconfiguration for multicast PTM transmission.

14. A network device for performing the method according to claim 8, comprising: a transceiver, a processor and a memory; wherein the memory stores a program executable by the processor, and the processor executes the program to perform:

receiving a packet data convergence protocol (PDCP) status report reported by a terminal according to a preset condition when the terminal receives multicast and broadcast services (MBS), wherein the PDCP status report is transmitted on a predetermined uplink channel;

transmitting retransmission of PDCP protocol data unit (PDU) to the terminal;

wherein the preset condition includes at least one of the following:

the network side transmits a PDCP status report poll;

when the terminal undergoes cell handover; or, the network side configures MBS service bearer reconfiguration message; wherein the reconfiguration message carries a data recovery indication, and the reconfiguration message includes reconfiguration from multicast point-to-multipoint (PTM) transmission to unicast point-to-point (PTP) transmission, or MBS Radio Bearer (MRB) reconfiguration for multicast PTM transmission.

15. A non-transitory processor-readable storage medium, comprising processor-executable instructions stored thereon; wherein the processor-executable instructions are configured to cause a processor to perform the method according to claim 1.

\*  \*  \*  \*  \*